US008517165B2

(12) United States Patent
Semmelrock et al.

(10) Patent No.: US 8,517,165 B2
(45) Date of Patent: Aug. 27, 2013

(54) CONVEYOR LINE FOR THE TRANSPORT OF ARTICLES

(75) Inventors: Albin Semmelrock, Raubling (DE); Johann Druml, Stephanskirchen (DE)

(73) Assignee: Krones AG, Neutraubling (DE)

( * ) Notice: Subject to any disclaimer, the term of this patent is extended or adjusted under 35 U.S.C. 154(b) by 72 days.

(21) Appl. No.: 13/068,097

(22) Filed: May 2, 2011

(65) Prior Publication Data
US 2011/0272244 A1  Nov. 10, 2011

(30) Foreign Application Priority Data
May 6, 2010  (DE) .......................... 10 2010 019 797

(51) Int. Cl.
*B65G 47/26* (2006.01)
(52) U.S. Cl.
USPC ...................... 198/457.05; 198/416; 198/445
(58) Field of Classification Search
USPC ..................... 198/445, 446, 452, 457.05, 416
See application file for complete search history.

(56) References Cited

U.S. PATENT DOCUMENTS

| | | | |
|---|---|---|---|
| 1,755,720 A | | 4/1930 | Winkler |
| 2,646,870 A | | 7/1953 | Parry |
| 2,805,753 A | * | 9/1957 | Palmer .......................... 198/374 |
| 3,202,333 A | * | 8/1965 | Skiba et al. .................... 226/189 |
| 4,231,463 A | * | 11/1980 | Vamvakas ...................... 198/446 |
| 4,627,529 A | * | 12/1986 | Tarlton et al. ................. 198/778 |
| 5,029,697 A | * | 7/1991 | McMillan et al. ......... 198/860.2 |
| 5,038,917 A | * | 8/1991 | Kronseder .................... 198/444 |
| 5,683,729 A | | 11/1997 | Valles |
| 5,772,006 A | | 6/1998 | Axmann |
| 5,937,995 A | | 8/1999 | Hartness |
| 5,971,698 A | * | 10/1999 | Dowling ..................... 414/788.7 |
| 6,050,396 A | * | 4/2000 | Moore ........................ 198/836.3 |
| 6,206,174 B1 | * | 3/2001 | Koltz ............................ 198/444 |
| 6,241,074 B1 | * | 6/2001 | Steeber ......................... 198/456 |
| 6,523,674 B1 | * | 2/2003 | Ouellette ................... 198/689.1 |
| 6,766,901 B2 | * | 7/2004 | Guldenfels et al. ........... 198/837 |
| 7,147,098 B2 | * | 12/2006 | Ledingham ................... 198/453 |
| 7,232,026 B2 | | 6/2007 | Heuft |
| 7,748,518 B2 | | 7/2010 | Hoellriegl et al. |
| 7,942,255 B2 | | 5/2011 | Seger et al. |
| 2009/0229952 A1 | * | 9/2009 | Baumstimler et al. ........ 198/446 |
| 2011/0064840 A1 | | 3/2011 | Borgatti et al. |

FOREIGN PATENT DOCUMENTS

| | | |
|---|---|---|
| DE | 27 43 885 A1 | 4/1979 |
| DE | 195 16 779 | 11/1996 |
| DE | 694 06 298 T3 | 3/1998 |

(Continued)

*Primary Examiner* — Gene Crawford
*Assistant Examiner* — Keith R Campbell
(74) *Attorney, Agent, or Firm* — Davidson, Davidson & Kappel, LLC

(57) ABSTRACT

A conveyor line (10) for the transport of articles (20, 24) in an article stream (18) from a first processing line (50) to a second processing line (52). The conveyor line (10) includes a first conveyor section (11) and a second conveyor section (12). On the first conveyor section (11) the article stream (18) is formed by at least two articles (20, 24) arranged mostly side by side, whereby the second conveyor section (12) includes at least one lane dividing plate (30) for the separation of the articles (20, 24) into at least two lanes (31). A third conveyor section (13) is arranged between the first conveyor section (11) and the second conveyor section (12), the third conveyor section (13) including multiple deflections of the articles (20, 24) along a path with multiple curves.

20 Claims, 5 Drawing Sheets

(56) References Cited

FOREIGN PATENT DOCUMENTS

| | | |
|---|---|---|
| DE | 202 14 153 | 3/2003 |
| DE | 20 2004 009532 | 9/2004 |
| DE | 10 2006 023 531 A1 | 11/2007 |
| DE | 10 2008 013 380 A1 | 9/2009 |
| EP | 2 027 047 B1 | 2/2009 |
| WO | WO 98/22374 A1 | 5/1998 |
| WO | WO 2006 050935 A1 | 5/2006 |
| WO | WO 2010/013211 A2 | 2/2010 |

* cited by examiner

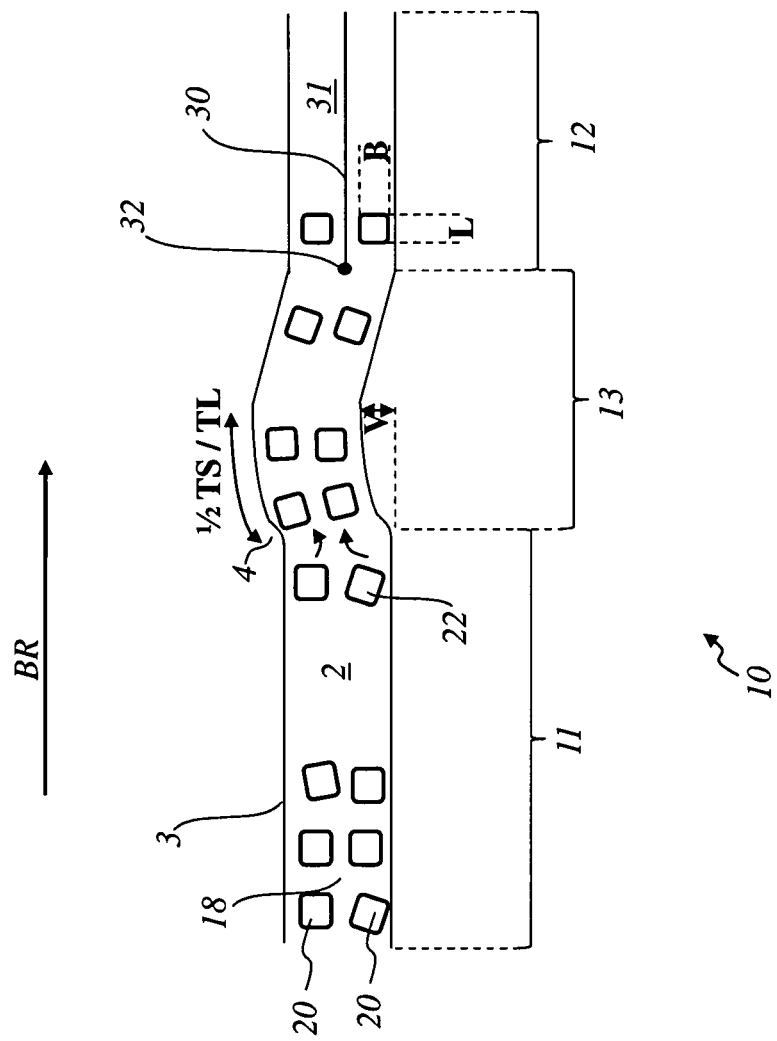

CONVEYOR LINE FOR THE TRANSPORT OF ARTICLES

This claims the benefit of German Patent Applications DE 10 2010 019 797.1, filed May 6, 2010 that is incorporated by reference herein.

The present invention relates to a conveyor line for the transport of articles in an article stream from a first processing line to a second processing line. The conveyor line comprises a first conveyor section and a second conveyor section. The article stream in the first conveyor section comprises at least two articles arranged almost side by side. The second conveyor section comprises at least one lane dividing plate for the separation of the articles into at least two lanes.

BACKGROUND

During the transport of articles from a first processing line to a second processing line, especially in the in feed area of packaging machines, the articles/containers usually arrive in a so called mass flow and are separated into single lanes.

Blockades during separation into the single lanes can occur. The blockages especially occur when the articles have a squared base area and are rotated around their longitudinal axis during transport. This happens for instance when articles are shifted laterally during transport and are arranged in the middle of a diagonal. This article then blocks the entrance of subsequent articles into the separate lanes, thereby hindering the further movement of these articles. This leads to massive disturbances.

U.S. Pat. No. 5,937,995 shows a so called chicane arranged at both sides of a conveyor line. The conveyor line narrows in the section just before the separation of the articles in single streams, so that the transported articles with a circular base area are arranged tightly packed into two rows. This arrangement facilitates the separation into single lanes. This device cannot be used to align shifted or distorted articles with a squared base area and prevent a blockade as described above.

SUMMARY OF THE INVENTION

A task of the present invention is to arrange and align the transported articles, especially articles with a squared base area to prevent a blockade in the in feed area before the articles are separated into lanes. It is an alternate or additional object of the present invention to provide a conveyor line for the transport of articles in an article stream from a first processing line to a second processing line.

The present invention provides a conveyor line that can for example be used between a labeling machine and a machine forming packs out of a plurality of articles or a machine that applies handles onto the articles or packs. Such a conveyor line can also be used in the in feed area of packaging machines or the like.

The conveyor line comprises a first conveyor section and a second conveyor section. In the first conveyor section the articles are transported in an article stream, whereby at least two articles are arranged beside or almost side by side each other. The transported articles can be different containers, especially bottles that preferentially show a squared base area or form. The conveyor line can also be used for the transport of other articles, especially bottles with a circular base area or container form.

In the second conveyor section the articles are separated by at least one lane dividing plate into at least two lanes. The at least one lane dividing plate is located centrally or almost centrally in the middle of the transport plane, parallel to the transport direction. According to the invention a third conveyor section is arranged between the first conveyor section and the second conveyor section. The third conveyor section comprises at least one curvature. Preferentially the articles are deflected along a curved path. According to a preferred embodiment the third conveyor section is a curve comprising at least two sections with opposite curvatures.

The curvature or curvatures form a chicane in the transport process of the articles. The chicane orientates articles displaced into the middle of the transport plane that would later block the entrance of the articles into the separation lanes. Especially articles with a squared base area are realigned by the chicane and put back into the right transport position. For instance the longitudinal edges of distorted articles with a squared base area are realigned so that the longitudinal edges are arranged parallel to the transport direction. This prevents the blocking of the entrance or in feed area in front of the separation lanes which would otherwise block and prevent the separation of the two subsequently incoming neighboring articles into the lanes of the second conveyor section.

The third conveyor section is especially formed kind of sickle shaped or as a partial section of a circle. The partial section of the circle comprises a partial circumferential length that corresponds to at least the broadest width of three transported articles.

The at least one curvature of the third conveyor section leads to a deflection of the articles compared to the first and/or second conveyor section about a certain distance. The distance is determined by the shape of the third conveyor section. The distance preferentially corresponds to at least half the width or length of the transported articles perpendicular to the transport direction. If articles with a circular base area are transported, the distance corresponds preferentially to at least half the diameter of the articles. The required distance can be adjusted according to the transported articles with the described possibilities to change the third conveyor section as described below.

The chicane leads to a deflection of the containers perpendicular to the transport direction. In the case of containers with a circular base area, the chicane especially leads to a deflection of the containers from the transport path that corresponds to at least half of the width or diameter of the containers. This leads to the already described advantageous realignment of the containers.

According to another embodiment of the invention the chicane is only formed by about half the partial circumferential length as described above. When the third conveyor section is formed only by half the radius or curved design, the containers do not return to a transport path that is in line with the first conveyor section. Therefore in this variant the second conveyor section is shifted and arranged parallel to the first conveyor section.

According to another embodiment of the invention, the chicane comprises a linear section arranged after half the partial section described above. Preferentially the linear section is attached to the partial section in a way that the subsequently arranged second conveyor section is in line with the first conveyor section.

In yet another embodiment of the invention the guiding elements of the second conveyor section are extending conically. Therefore the guidance rails of the second conveyor section only partially run in line with the guidance rails of the first conveyor section.

Another preferred embodiment of the invention shows guiding elements of the third conveyor section that are connected bluntly with the guidance rails of the first and/or second conveyor section.

The third conveyor section arranged between the first and the second conveyor section comprises lateral guiding elements for the restriction of the article stream. According to an embodiment of the invention the lateral guiding elements are composed of individual segments that are movable. The individual segments can be moved in an angle against each other, comparable to the links of a chain. It is therefore possible to adjust a variable radius. The chicane can be specially customized according to the transported articles. In this way an "S"-shaped deflection or something similar can be formed.

The linkage between the segments can be restricted. Especially the mobility/flexibility of the individual segments in relation to each other can be restricted to a maximum angle of 180°, thereby limiting the adjustment possibilities of the individual segments. In this case the lateral guidance can only form a sickle shape chicane but not an "S" shaped chicane.

The guidance rails of the three conveyor sections can be adjusted by shifting them parallel in relation to each other, especially by shifting them so that they are still arranged parallel. This also allows a flexible adjustment regarding the properties of the transported articles.

To facilitate the transport of the articles the lateral guiding elements of the third conveyor section can show slip promoting properties. The guiding elements can comprise highly polished stainless steel side plates or a slip promoting coated surface, for example a Teflon coating, a sliding lacquer coating or the like.

The inner side surfaces of the chicane enclosing the transport route can comprise further guiding elements that can be customized according to the transported articles. When changing the format or product, for instance when changing the bottle geometries (length, width or diameter), the basic guidance or basic chicane has not to be changed but can be adjusted by exchanging the guiding elements. The guiding elements are attached by means known to the expert in the technical field. The guiding elements are preferably detachably fastened for example by pinning, clipping, use of magnetic connecting elements, screws or the like. To allow a largely friction less transport of the articles, the guiding elements—like the guiding rails—preferably have slip promoting properties. They can for instance comprise rollers or the like.

The articles aligned in the third conveyor section are then moved into the second conveyor section, where they are separated into lanes by at least one lane dividing plate. According to one preferred embodiment of the invention the at least one lane dividing plate comprises a roller in the in feed area for the articles, especially in the border area between the third and the second conveyor section. This roller is movably supported, preferably free running and facilitates the feeding of the articles into the lanes. The free running roller is arranged at the front of the lane dividing plate facing the third conveyor section. Preferably the roller is arranged about the whole height of the lane dividing plate. The lane dividing plate itself is preferably mounted in the middle of the second conveyor section, parallel to the transport direction.

In the conveyor line the articles are preferably transported on an endless belt conveyor, especially a modular conveyor belt comprising a number of chain links which is also called mat conveyor or the like.

BRIEF DESCRIPTION OF THE DRAWINGS

The attached FIGS. 2 to 5 illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 2 shows a schematic representation of a first embodiment of a conveyor line.

FIG. 3 shows a schematic representation of a transporting device comprising a plurality of conveyor lines.

FIG. 4 shows a schematic representation of a second embodiment of a conveyor line.

FIG. 5 shows a schematic representation of a third embodiment of a conveyor line.

Figure 1:
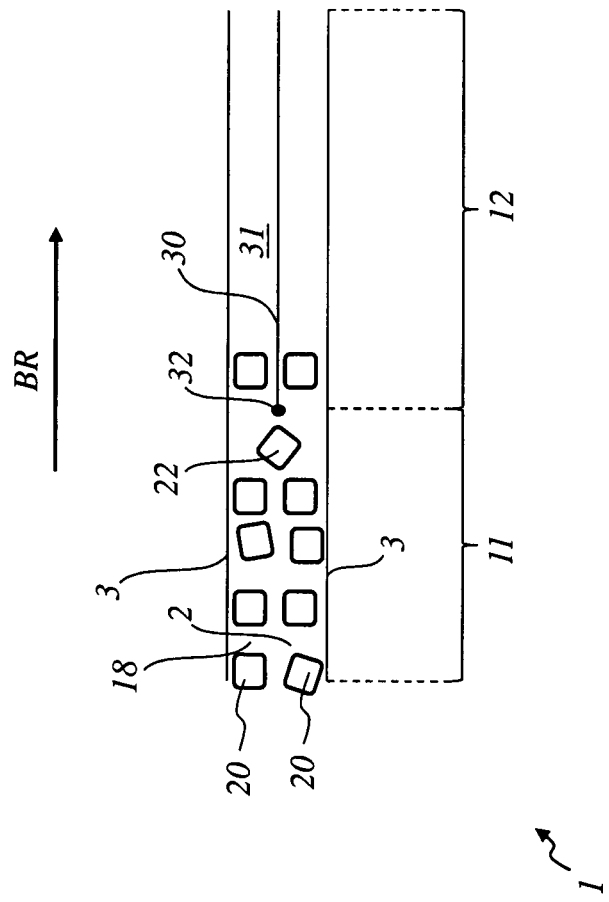
FIG. 1 shows a schematic representation of a conveyor line according to the known state of the art.

The same or equivalent elements of the invention are designated by identical reference characters. Furthermore and for the sake of clarity, only the reference characters relevant for describing the respective figure are provided. It should be understood that the detailed description and specific examples of the device according to the invention, while indicating preferred embodiments, are intended for purposes of illustration only and are not intended to limit the scope of the invention.

DETAILED DESCRIPTION

FIG. 1 shows a schematic top-view representation of a conveyor line 1 according to the known state of the art. The conveyor line 1 comprises a first conveyor section 11 and a second conveyor section 12, whereby the articles 20 are transported in transport direction BR.

In the first conveyor section 11 the articles 20 are transported in an article stream 18 in multiple rows on a mat conveyor 2 or the like. The article stream 18 is limited by lateral guidance rails 3. The second conveyor section 12 comprises a lane dividing plate 30 for the separation of the articles 20 of the incoming article stream 18 into individual lanes 31. The lane dividing plate 30 can comprise a roller 32 to facilitate the guidance of the articles 20. The lane dividing plate 30 is preferentially arranged in the middle between the lateral guidance rails 3. The roller 32 is arranged at the front of the lane dividing plate 30 facing the incoming articles 20 and preferentially extending about the whole height of the lane dividing plate 30.

During the transport of the articles 20 on the first conveyor section 11 the articles 20 might shift or rotate, thereby arranging themselves diagonally. A twisted article 22 blocks the entrance of subsequently following articles 20 into the lanes 31 which leads to a massive disturbance.

Figure 2:
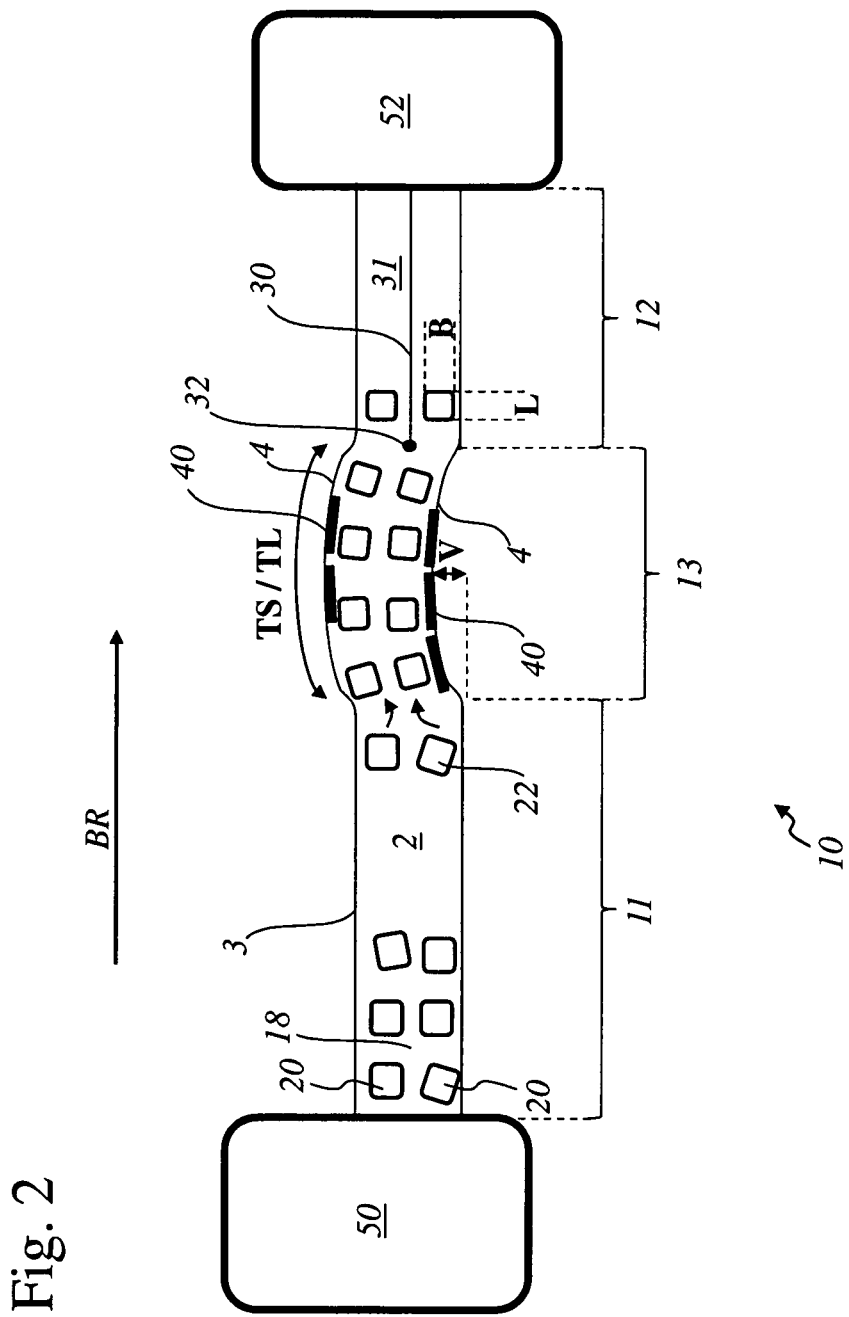

FIG. 2 shows a schematic top-view representation of a conveyor line 10 according to the present invention, where articles 20 are transported from a first processing device 50 to a second processing device 52 and thereby get separated into single lanes 31. The conveyor line 10 comprises a first conveyor section 11, a second conveyor section 12 and according to the invention a third conveyor section 13 arranged between the first conveyor section 11 and the second conveyor section 12.

The third conveyor section 13 forms a chicane in the transport direction BR of the articles 20 leading to a realignment of the articles 20, especially leading to a realignment of twisted articles 22.

The articles 20 fed into the third conveyor section 13 are rotated because of the sickle shaped curvature of the lateral guidance 4 in the third conveyor section 13 of the conveyor line 10. Especially when articles 20 with a squared base area are transported on the conveyor line 10 they are rotated in the third conveyor section 13 whereby their long side L is aligned almost parallel to the lateral guidances 4. When the articles 20 leave the third conveyor section 13 and are fed into the second conveyor section 12 the adjusted orientation of the articles 20 is maintained. Because of this adjusted orientation a correct separation of the articles 20 into the lanes 31 is possible and therefore the occurrence of blockage is prevented.

According to the preferred embodiment of the chicane formed by the third conveyor section 13, the articles 20 deviate from their transport route by at least half an article width B or in the case of articles 24 with a circular base area (see FIG. 3) by at least half the diameter D of the article 24 which leads to the realignment of the twisted articles 22 as described above.

The represented third conveyor section 13 is preferably a partial segment of a circle TS that comprises a partial circumferential length TL. The partial circumferential length TL corresponds to at least the broadest width B or length L of three transported articles 20 or in the case of articles 24 with a circular base area the partial circumferential length TL corresponds to at least the diameter of three transported articles 24.

The curvature or curvatures of the third conveyor section 13 lead to a deviation of the articles 20, 22 from the first and/or second conveyor section 11, 12 about a certain distance V. The maximum deviation V is determined by the exact arrangement or curvature of the third conveyor section 13. Preferentially the distance V corresponds to at least half the width B or half the length L of the transported articles 20, 22 depending on the orientation of the article, especially depending on their orientation perpendicular to the transport direction. If the transported articles 24 have a circular base area (see FIG. 3) then the distance V corresponds preferably to at least half the diameter of the base area of the article 24.

The inner sides of the lateral guidances 4 in the third conveyor section 13 can comprise additional guiding elements 40 that can be adapted or customized to the different sizes of the transported articles 20, 24. When changing the format or product, for instance when changing the bottle geometries (length, width or diameter), the curvature of the basic guidance or lateral guidance 4 of the third conveyor section 13 has not to be changed or exchanged but can be adjusted by exchanging the guiding elements 40. The guiding elements 40 are detachably fastened for example by pinning, clipping, use of magnetic connecting elements, a rail connection system, screws or the like. To allow a largely friction less transport of the articles the guiding elements 40 can have slip promoting properties. They can for instance comprise rollers or the like.

The guiding elements 40 can be attached to the entire lateral guidances 4 of the third conveyor section 13 or just to a part of it.

Figure 3:
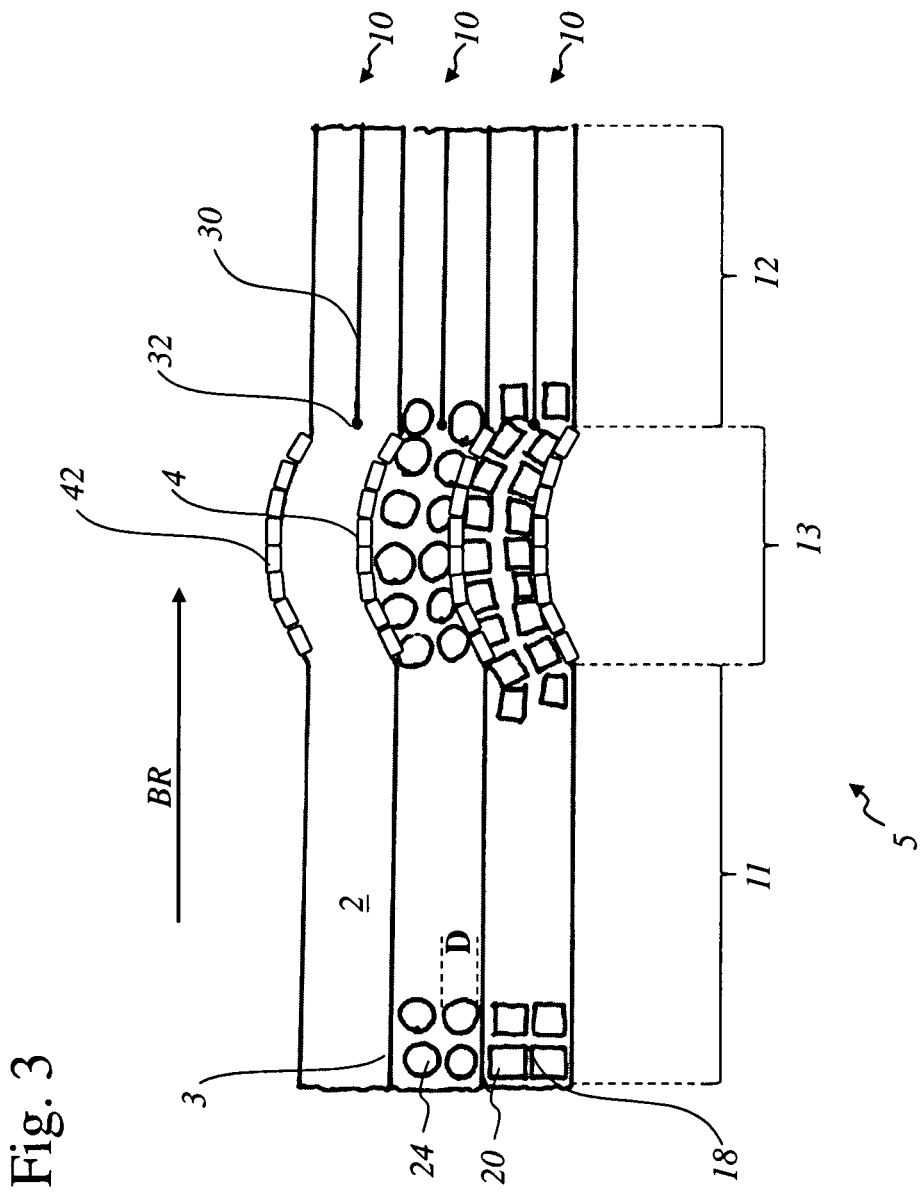

FIG. 3 shows a schematic representation of a transporting device 5 comprising a plurality of conveyor lines 10. FIG. 3 especially shows that a conveyor line 10 according to the invention is especially suitable for the transport of articles 20 with a squared base area. The conveyor line 10 prevents the blockade problems in the in feed area just before the articles 20 are separated into the lanes 31 in the second conveyor segment 12. A conveyor line 10 according to the invention can also be used for the transport of articles 24 with a circular base area. If other articles 20, 24 shall be transported no conversion of the conveyor line 10 is necessary.

FIG. 3 also shows that the chicane or lateral guidances 40 of the third conveyor segment are connected bluntly with the guidance rails 3 of the first and second conveyor section 11, 12. The drawing furthermore shows that the third conveyor section 13 comprises lateral guiding elements 4 for the restriction of the article stream 18 that are composed of individual movable segments 42. The individual segments 42 can be moved in an angle against each other, comparable to the links of a chain. It is therefore possible to adjust a variable radius. The chicane can be specially customized according to the transported articles 20, 24. In this way a "S"-shaped deflection or something alike can be formed.

Figure 4:
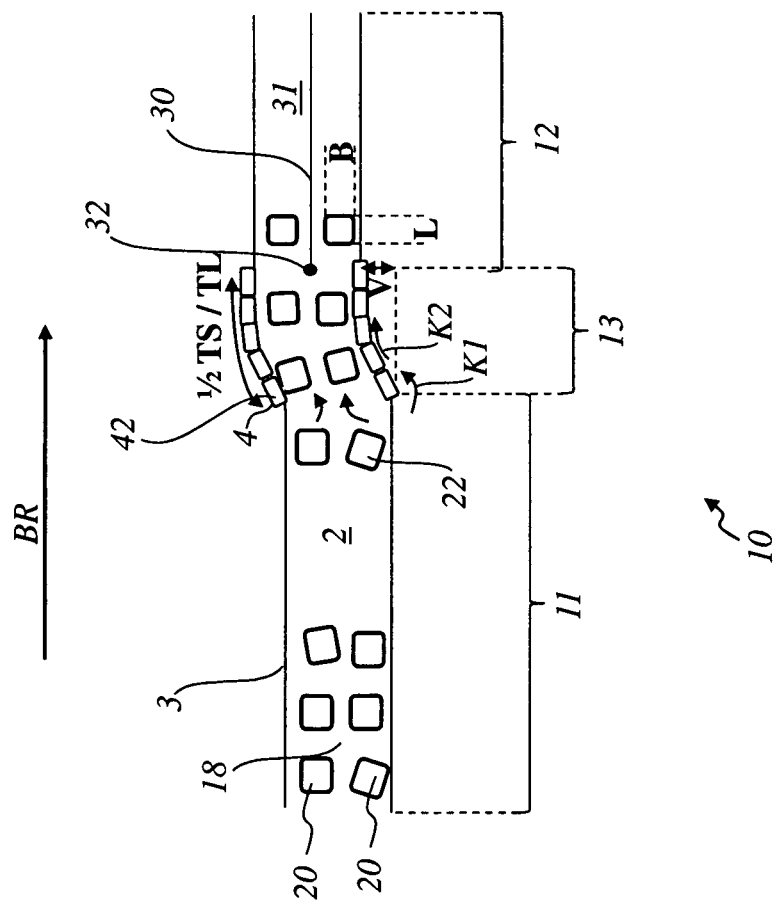

FIG. 4 shows a schematic representation of a second embodiment of a conveyor line 10. According to this embodiment the third conveyor section 13 is only formed by about half the partial circumferential length TL (compared to the embodiments shown in FIGS. 2 and 3) and is directly connected to the second conveyor section 12. In this embodiment the second conveyor section 12 runs parallel to the first conveyor section 11.

FIG. 5 shows a schematic representation of a third embodiment of a conveyor line 10. In this embodiment the third conveyor section 13 comprises a linear section arranged after half the partial section TL as described in FIG. 4. The second linear part of the third conveyor section 13 is attached to the first partial circle segment of the third conveyor section 13 in an angle in such a way that the subsequently arranged second conveyor section 12 is in line with the first conveyor section 11.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE NUMBERS 1 conveyor line
2 mat conveyor=modular conveyor belt comprising a number of chain links
3 guidance rails
4 lateral guidance in the third conveyor section
5 transporting device
10 conveyor line
11 first conveyor section
12 second conveyor section
13 third conveyor section
18 article stream
20 articles/article with squared base area
22 twisted article with squared base area
24 article with circular base area
30 lane dividing plate
31 (individual) lane
32 roller
40 guiding element
42 individual segments
50 first processing device
52 second processing device
B article width
BR transport direction
D article diameter
L long side/article length
TL partial circumferential length
TS partial segment of a circle
V distance/maximum deviation

What is claimed is:

1. A conveyor line in a feed area of a packaging machine for separating and directing a mass flow stream of articles into single lanes, the conveyor line comprising:

a first conveyor section having a first transport path and having an endless belt or modular conveyor belt comprising a number of chain links;

a second conveyor section, the article mass flow stream comprising at least two articles arranged mostly side by side on the first conveyor section, the second conveyor section comprising at least one lane dividing plate for separation of the articles into at least two lanes, the second conveying section having a second transport path; and a third conveyor section arranged between the first conveyor section and the second conveyor section, the third conveyor section having a chicane defined by curved lateral guidance elements for deflecting the mass flow stream and restricting the mass flow stream and forming a curved path;

the first transport path and second transport path being in line or parallel.

2. The conveyor line as recited in claim 1 wherein at least one of the lateral guidance elements including individual movably-supported segments.

3. The conveyor line as recited in claim 1 wherein the third conveyor section has a partial peripheral length and a partial circumferential length corresponding to at least a broadest width of three transported articles.

4. The conveyor line as recited in claim 1 wherein the third conveyor section exhibits a curvature towards the first and/or second conveyor section for deviation of the articles about a distance from the first and/or second conveyor section, the distance corresponding to at least half the width or length of the articles perpendicular to the transport direction or at least half the diameter of the articles.

5. The conveyor line as recited in claim 2 wherein the lateral guiding elements of the third conveyor section comprise a slip promoting coating.

6. The conveyor line as recited in claim 2 wherein the lateral guiding elements of the third conveyor section and/or the guidance rails of the first and second conveyor section are movable parallel to each other.

7. The conveyor line as recited in claim 1 wherein the at least one lane dividing plate of the second conveyor section comprises a roller.

8. The conveyor line as recited in claim 1 wherein the conveyor line comprises a modular conveyor belt comprising a number of chain links.

9. The conveyor line as recited in claim 1 wherein the third conveyor section comprises detachable guiding elements for the articles.

10. The conveyor line as recited in claim 9 wherein the guiding elements have slip promoting properties.

11. The conveyor line as recited in claim 1 wherein the first transport path and second transport path are in line.

12. The conveyor line as recited in claim 1 wherein the second transport path is shifted and arranged parallel with respect to the first transport path.

13. The conveyor line as recited in claim 1 wherein the articles in the first and second conveyor sections move a same direction.

14. The conveyor line as recited in claim 1 wherein the curved path is adjustable according to the articles to be transported.

15. The conveyor line as recited in claim 1 wherein the chicane is at least two articles wide.

16. The conveyor line as recited in claim 1 wherein the lane dividing plate starts at a downstream end of the chicane.

17. The conveyor line as recited in claim 1 wherein the lateral guidance elements are stationary as the articles pass through the chicane.

18. A method for transporting articles in a conveyor line in a feed area of a packaging machine for separating and directing a mass flow stream of articles into single lanes, the conveyor line including: a first conveyor section having a first transport path and having an endless belt or modular conveyor belt comprising a number of chain links; a second conveyor section, the article mass flow stream comprising at least two articles arranged mostly side by side on the first conveyor section, the second conveyor section comprising at least one lane dividing plate for separation of the articles into at least two lanes, the second conveying section having a second transport path; and a third conveyor section arranged between the first conveyor section and the second conveyor section, the third conveyor section having a chicane defined by curved lateral guidance elements for deflecting the mass flow stream and restricting the mass flow stream and forming a curved path; the first transport path and second transport path being in line or parallel, the method comprising:

transporting square form or square base articles on the conveyor line.

19. The method as recited in claim 18 further comprising rotating the square form or square base articles in the third conveyor section.

20. The method as recited in claim 18 wherein the chicane realigns twisted articles so that lengthwise sides of the square form or square base articles are parallel in the second section.

* * * * *